Patent …

United States Patent [19]
Penterman

[11] Patent Number: 4,571,156
[45] Date of Patent: Feb. 18, 1986

[54] AIR FOIL WITH TRAILING SPOILER

[75] Inventor: Francis M. Penterman, Pine River, Wis.

[73] Assignee: D. C. Research, Inc., Appleton, Wis.

[21] Appl. No.: 586,039

[22] Filed: Mar. 5, 1984

[51] Int. Cl.⁴ .............................................. F03D 7/04
[52] U.S. Cl. .................................. 416/132 B; 416/23; 416/41
[58] Field of Search ........... 416/132 R, 132 B, 132 A, 416/41 A, 131, 23, 24

[56] References Cited

U.S. PATENT DOCUMENTS

| | | | |
|---|---|---|---|
| 1,133,595 | 3/1915 | Wenger | 416/132 B X |
| 1,633,842 | 6/1927 | Bishop | 416/202 X |
| 1,757,292 | 5/1930 | Caldwell | 416/223 R X |
| 1,880,143 | 9/1932 | Larum | 416/132 B |
| 1,919,588 | 7/1933 | Heath | 416/132 B X |
| 2,054,383 | 9/1936 | Ludewig | 416/202 X |
| 2,131,217 | 9/1938 | Brumwell | 416/223 R X |
| 2,450,440 | 10/1948 | Mills | 416/223 R |
| 2,493,895 | 1/1950 | Osterback | 416/132 B |
| 2,622,686 | 12/1952 | Chevreau et al. | 416/23 |
| 2,791,281 | 5/1957 | Boyd | 416/132 B |
| 2,917,255 | 12/1959 | Boyd | 416/132 R X |
| 3,038,543 | 6/1962 | Davidson | 416/132 B |
| 3,044,557 | 7/1962 | Posh | 416/132 A |
| 3,275,082 | 9/1966 | Stark | 416/132 R X |
| 3,597,108 | 8/1971 | Mercer et al. | 416/132 B X |
| 3,850,545 | 11/1974 | Weir | 416/132 A |
| 3,874,816 | 4/1975 | Sweeney et al. | 416/132 B X |
| 4,171,929 | 10/1979 | Allison | 416/237 B X |
| 4,191,506 | 3/1980 | Packham | 416/237 B X |
| 4,335,996 | 6/1982 | Ross | 416/23 X |
| 4,355,956 | 10/1982 | Ringrose et al. | 416/132 B |
| 4,415,311 | 11/1983 | Grana et al. | 416/117 |
| 4,423,333 | 12/1983 | Rossman | 416/23 X |

FOREIGN PATENT DOCUMENTS

| | | | |
|---|---|---|---|
| 968411 | 11/1950 | France | 416/23 |
| 2288877 | 5/1976 | France | 416/132 B |
| 2430526 | 3/1980 | France | 416/132 B |
| 23374 | 2/1980 | Japan | 416/132 B |
| 102074 | 9/1946 | Netherlands | 416/132 B |
| 7745 | 3/1909 | United Kingdom | 416/132 B |
| 2068472 | 8/1981 | United Kingdom | 416/23 |

Primary Examiner—Everette A. Powell, Jr.
Attorney, Agent, or Firm—Eric P. Schellin

[57] ABSTRACT

An air foil which is coupled to a wind energy conversion machine is provided with a flexible and resilient trailing spoiler that limits the rotational speed of the machine and prevents overspeeding. The trailing spoiler is a flexible and resilient sheet that is laminated to the upwind side of a rigid blade so that a portion of the sheet extends past the trailing edge of the blade. The portion of the sheet that extends past the trailing edge bends towards the wind during high wind conditions to prevent overspeeding of the machine.

16 Claims, 5 Drawing Figures

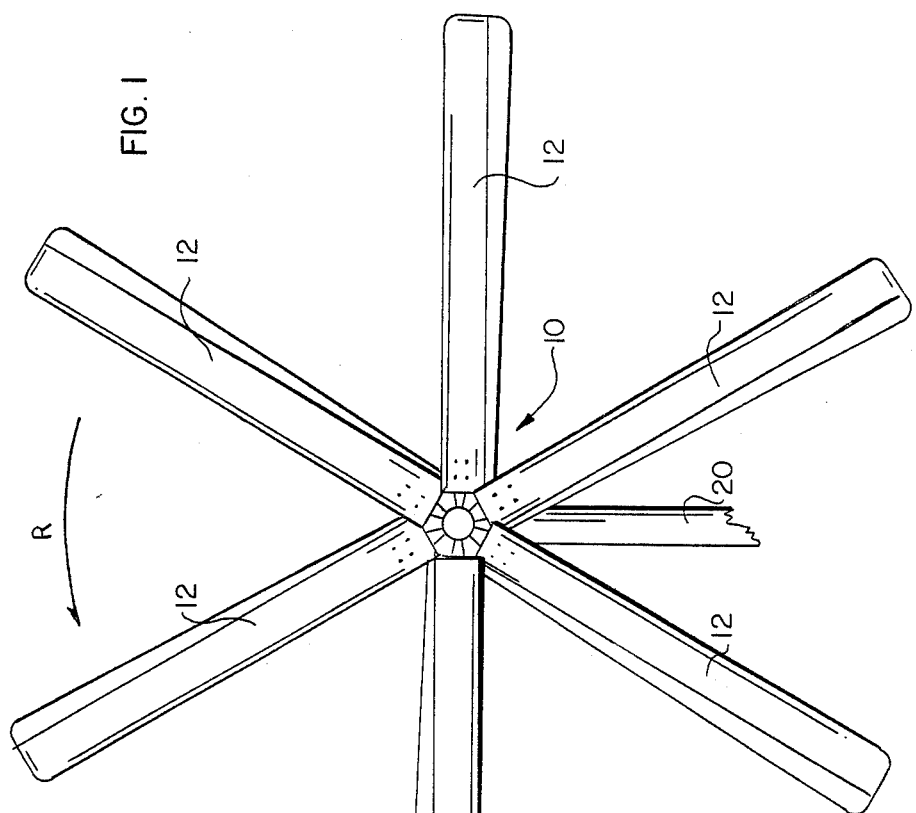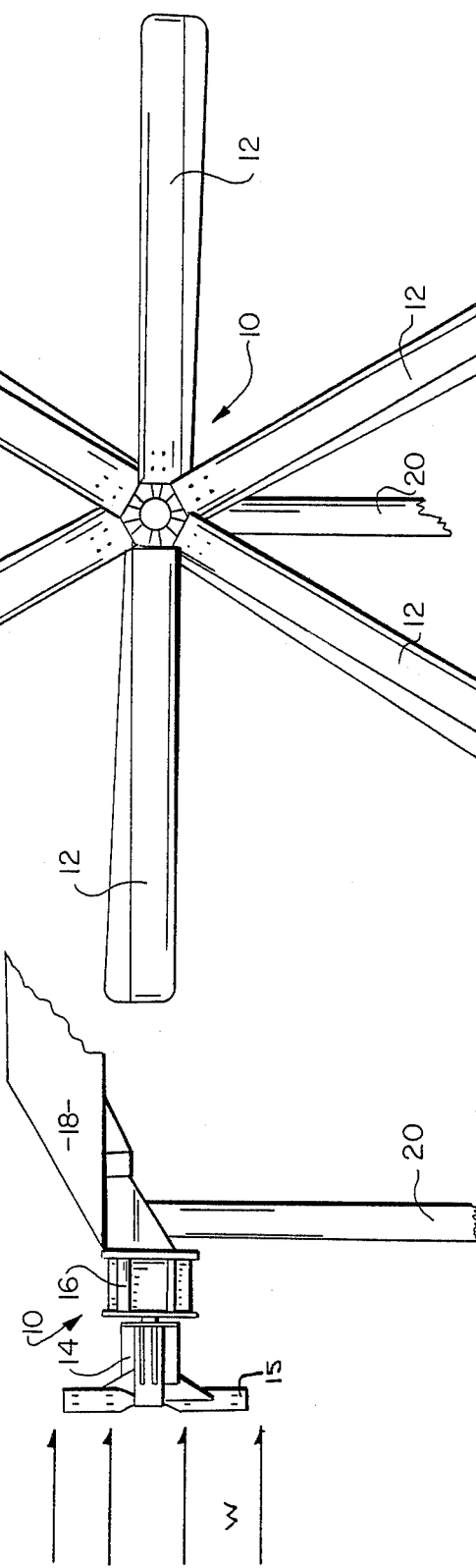

AIR FOIL WITH TRAILING SPOILER

BACKGROUND OF THE INVENTION

1. Field of the Invention:

The invention is related to air foils for wind energy conversion machines, and more specifically to air foils which limit the rotational speed of the machine to prevent overspeeding.

2. Description of the Prior Art:

It has long been known that wind energy can be harnessed and converted into mechanical rotational energy to create useful work. Typically, air foils are radially attached to a freely rotatable hub so that as air strikes the air foils a torque is created on the hub and the hub is rotated. The hub is usually connected to a drive shaft for either directly utilizing the mechanical power of the shaft for water pumping or grinding; or the shaft is connected to a generator for producing electrical energy.

A principal problem associated with wind energy is the damage associated with overspeeding of a wind machine when high winds produce high speeds of rotation. Overspeeding results when the speed of the machine exceeds it's design speed. If the overspeeding condition persists for very long the machine may be destroyed.

The most common method of reducing the force of the wind on the machine is to move a rudder vane, which normally positions the machine into the wind, parallel to the air foils so that the machine is pointed parallel to the wind. Such a configuration is disclosed in U.S. Pat. No. 2,376,020. Another means to lessen the force of the wind on the machine is to change the angular position of individual air foils to the wind. This maybe accomplished automatically by governors, auxiliary air foils, or other means that monitor the rotational speed of the air foils or the wind. Such wind machines that change the angular configuration of the the air foils to the wind in response the speed of the machine are disclosed in U.S. Pat. Nos. 2,106,557, 2,688,285, 4,105,363 and 4,111,601.

Changing the angular position of individual air foils necessitates the use of complicated linkages and assemblies to control the position of each air foil. An alternative to changing the angular position of each air foil, is to change the shape of each air foil. Changing the shape of each air foil can also limit the rotational speed of the machine and air foils preventing overspeeding. Flexible propellers for planes were proposed in U.S. Pat. No. 1,454,356, where a flexible propeller is disclosed which is flexible in both the longitudinal and transverse direction. In wind energy machines it has been proposed to twist the leading edge of the air foil to control the air foil's shape, as disclosed in U.S. Pat. No. 3,874,816. A more simplified procedure is to form the air foil of two or more pivotally connected pieces. Springs can then be used to hold the air foil in the proper configuration for normal wind conditions. During high wind conditions the spring tension is overcome and the air foil assumes another configuration with less surface area exposed to the wind. Air foils of this configuration are disclosed in U.S. Pat. Nos. 13,244, 192,668 and 1,403,069.

It is the object of the present invention to provide a simplified speed limiting means for an air foil, which is automatically actuated during high wind conditions.

SUMMARY OF THE INVENTION

The present invention comprises a drag type air foil for a wind energy conversion machine. The air foil comprises a fixed blade means to which is secured a flexible and resilient sheet material. The sheet material extends past the trailing edge of the blade and acts as a trailing spoiler. That portion of the sheet material that extends from the trailing edge of the blade means comprises a flexing portion that remains parallel with the blade means during normal wind condition and bends towards the wind during high wind conditions. This flexing portion acts as a spoiler limiting the speed of the air foil and thereby limiting the rotational speed of the machine preventing overspeeding.

BRIEF DESCRIPTION OF THE DRAWINGS

FIG. 1, is a frontal view of a wind energy conversion machine utilizing the present invention;

FIG. 2, is a side view of the rotor hub and generator;

DETAILED DESCRIPTION

Figure 3:
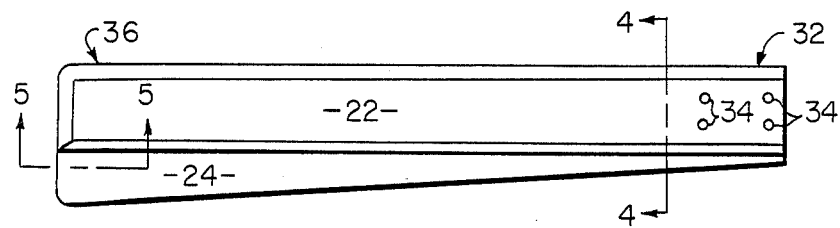
FIG. 3, is the top view of one of the air foils of the present invention.

FIG. 1 illustrates a wind energy conversion machine 10 having six air foils 12. The air foils are secured to freely rotatable rotor hub 14, illustrated in FIG. 2, which is coupled to electric generator 16. Hub 14 is provided with angularly oriented plates 15 (two illustrated) which are secured to air foils 12. An extended rudder vane 1' is used to position the air foils into the wind to capture the wind energy and generate electric energy. The machine is mounted on tower 20 so that the air foils can be located above obstructions to the wind, and to position the machine to a level where wind velocities are greater.

The wind machine illustrated in FIG. 1 is a drag type rotor which is designed to extract maximum torque at a lower rotational velocity. The machine is also an upwind machine to extract the maximum power from the wind and to eliminate the tower shadow problem associated the downwind machines. The wind direction is illustrated by arrows W in FIGS. 2 and 4.

Wind striking air foils 12 produces a rotational torque on the rotor hub to which the air foils are attached. The air foils and hub, in the illustrated embodiment, rotate counter clockwise as indicated by arrow R in FIG. 1. As wind velocity increases the rotational speed of the rotor and the attached air foils increases. During high wind conditions the rotational speed of the machine may exceed the design of the machine resulting in a dangerous overspeeding condition which can destroy the machine. The air foils of the present invention are provided with a trailing spoiler to limit the rotational speed of the air foils and prevent overspeeding.

The air foil illustrated in FIG. 3, is representative of all of the air foils coupled to the rotor hub of the machine. Air foil 12 comprises blade means 22 and trailing spoiler 24. The blade means is formed of a rigid material such as wood and is provided with leading edge 26, main body 28 and trailing edge 30. In addition, inner end 32 of the blade means is provided with holes 34 for bolting the blade onto plates 15 of the rotor hub. At the other end of the blade is outer tip 36.

Figure 4:
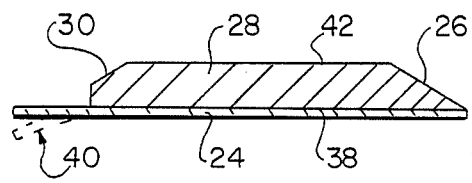
FIG. 4, is a cross sectional view along line 4—4.
Figure 5:
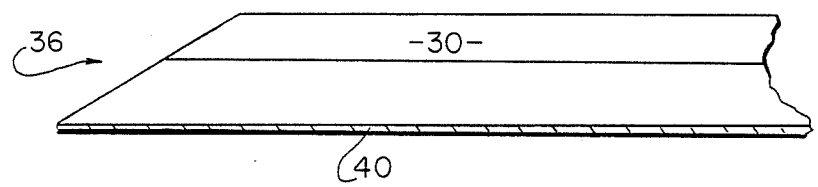
FIG. 5, is a cross sectional view along line 5—5.

Trailing spoiler 24 is formed of a flexible and resilient sheet which is secured to upwind surface 38 of the blade means. As indicated in FIG. 4, the prevailing wind W pushes against upwind surface 38 at an angle defined by angularly oriented plates 15 of the hub causing the air foils and the hub to rotate. The trailing spoiler sheet maybe formed from a plastic reinforced material such as Filon, manufactured by Vistron Corporation, and maybe secured to the blade by a polyester resin. Flexing portion 40 of the spoiler extends past trailing edge 30 of the blade means. As illustrated in FIG. 4, during high speed rotation of the air foil flexing portion 40 of the trailing spoiler flexes towards the wind limiting the rotational speed of the air foil.

The blade itself is shaped to extract the maximum energy from the wind. Downwind surface 42 is bevelled adjacent leading edge 26 and outer tip 36 to form a sharp leading edge for cutting the air through which the air foil passes. The main body adjacent the trailing edge is partially bevelled to form a truncated bevelled trailing edge.

The junction of the outer tip and the leading edge of the blade is curved to prevent cupping and dipping of the blade tip during rotation.

While the air foil disclosed herein constitutes a preferred form of the invention, and as such maybe modified without departing from the spirit of the invention, however the scope of the invention is to be limited solely by the claims that follow.

I claim:

1. An air foil for extracting rotational mechanical energy from wind, comprising:
    a blade means having an elongated rigid main body that is provided with a leading edge and a trailing edge that are substantially parallel with the longitudinal axis of the elongated main body; and
    a flexible and resilient sheet forming a trailing spoiler that is adjacent the trailing edge so that a flexing portion of the sheet extends past the trailing edge, laterally from the elongated main body, the flexing portion bends towards the wind when said air foil is overspeeding to limit rotational speed of the air foil thereby preventing overspeeding.

2. An air foil as defined by claim 1 wherein the main body of said blade means has upwind and downwind surfaces, said trailing spoiler is secured to the upwind surface of the main body.

3. An air foil as defined by claim 2 wherein the leading edge of said blade means is angled.

4. An air foil as defined by claim 3 wherein the downwind surface of the main body of said blade means adjacent the leading edge is bevelled towards the leading edge to form the sharp edge of the leading edge.

5. An air foil as defined by claim 4 wherein said blade means is provided with an inner end which is provided with coupling means for coupling said blade means to a rotor hub of a wind energy conversion machine.

6. An air foil as defined by claim 5 wherein said blade means is further provided with an outer tip disposed on the outer end of said blade means opposite the inner end of said blade means, the outer tip is formed into a sharp edge by bevelling the main body adjacent the outer tip of said blade means towards the outer tip.

7. An air foil as defined by claim 6 wherein the downwind surface of said blade means adjacent the trailing edge is partially bevelled to form a truncated bevelled trailing edge for said blade means.

8. A wind energy conversion machine for extracting rotational mechanical energy from wind comprising:
    a freely rotatable rotor hub which is operationally coupled to a load;
    at least one blade means secured to said rotor hub, said blade means having an elongated rigid main body that is provided with a leading edge and a trailing edge that are substantially parallel with the longitudinal axis of the elongated main body; and
    a flexible and resilient sheet forming a trailing spoiler which is secured to said blade means adjacent the trailing edge so that a flexing portion extends past the trailing edge, laterally from the elongated main body, the flexing portion bends towards the wind when the machine is overspeeding to limit rotational speed of the machine thereby preventing overspeeding of said machine.

9. A wind energy conversion machine as defined by claim 8 wherein the main body of said blade means has upwind and downwind surfaces, said trailing spoiler is secured to the upwind surface of said main body.

10. A wind energy conversion machine as defined by claim 9 wherein the leading edge of said blade means is angled.

11. A wind energy conversion machine as defined by claim 10 wherein the downwind surface of the main body of said blade means adjacent the leading edge is bevelled towards the leading edge to form the sharp edge of the leading edge.

12. A wind energy conversion machine as defined by claim 11 wherein said blade means is further provided with an outer tip disposed on the outer end of said blade means opposite the inner end of said blade means, the outer tip is formed into a sharp edge by bevelling the main body adjacent the outer tip of said blade means towards the outer tip.

13. A wind energy conversion machine as defined by claim 12 wherein the leading edge and the outer tip of said blade means form a junction that is curved to prevent cupping and dipping of the outer tip of said blade means.

14. A wind energy conversion machine as defined by claim 13 wherein the downwind surface of said blade means adjacent the trailing edge of said is partially bevelled to form a truncated bevelled trailing edge for said blade means.

15. An air foil for extracting rotational mechanical energy from wind, the air foil is adapted to be coupled to a rotor hub of a wind energy conversion machine, the air foil comprising a blade means having an elongated rigid main body that is provided with a leading edge and a trailing edge that are substantially parallel with the longitudinal axis of the elongated main body; and the improvement comprising:
    a flexible and resilient sheet forming a trailing spoiler that is secured to the blade means adjacent the trailing edge so that a flexing portion of the sheet extends past the trailing edge, laterally from the elongated main body, the flexing portion bends towards the wind when said air foil is overspeeding to limit the rotational speed of the air foil thereby preventing overspeeding.

16. An air foil as defined by claim 15 wherein the blade means is provided with a main body having upwind and downwind surfaces, said trailing spoiler is secured to the upwind surface of the main body.

* * * * *